A. ROSIER.
Doubletree-Clevis.

No. 204,252. Patented May 28, 1878.

WITNESSES:
C. Neveux
C. Sedgwick

INVENTOR:
A. Rosier
BY
ATTORNEYS.

UNITED STATES PATENT OFFICE.

AARON ROSIER, OF SUSSEX, WISCONSIN.

IMPROVEMENT IN DOUBLE-TREE CLEVISES.

Specification forming part of Letters Patent No. 204,252, dated May 28, 1878; application filed April 4, 1878.

*To all whom it may concern:*

Figure 1:
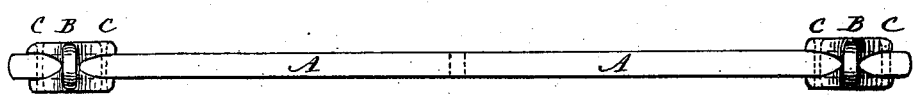
Figure 2:
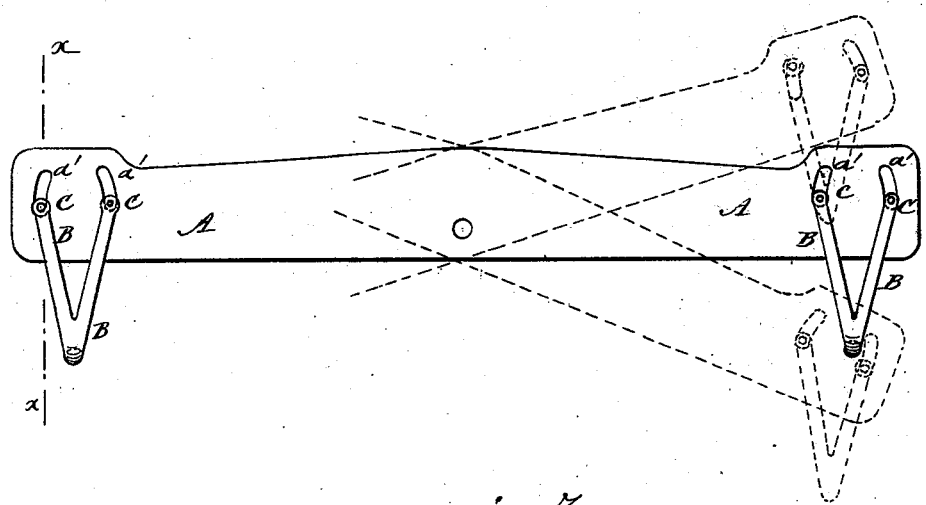
Figure 3:
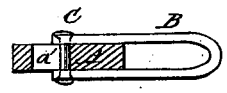

Be it known that I, AARON ROSIER, of Sussex, in the county of Waukesha and State of Wisconsin, have invented a new and useful Improvement in Double-Tree Clevises, of which the following is a specification:

Figure 1 is a front view of a double-tree to which my improved clevises have been applied. Fig. 2 is a top view of the same. Fig. 3 is a cross-section of the same, taken through the line $x$ $x$, Fig. 2.

Similar letters of reference indicate corresponding parts.

The object of this invention is to furnish double-tree clevises which shall be so constructed that should one of the horses of a team get behind the other the said clevises will adjust themselves automatically to give the said rear horse an advantage of leverage to enable him to regain his place at the side of the other horse, when the draft again becomes equal.

The invention consists in the clevises made with branched or V-shaped arms, as hereinafter described, to adapt them to operate in connection with the slotted ends of the double-tree, as set forth.

A is a double-tree, which is connected with the draft in the usual way. B are the clevises, which are bent at their centers into U form, and their arms are branched or made V-shaped horizontally, as shown in Fig. 2.

The clevises B are secured to the double-tree by bolts C, which pass through the ends of their branches, and through the slots $a'$ in the ends of the double-tree A.

The two slots $a'$ in each end of the double-tree A are each formed upon the arc of a circle having its center at the forward end of the other slot, as shown in Fig. 2.

The whiffletrees are connected with the bow of the clevises C in the usual way.

With this construction, should one of the horses fall in the rear of the other, the draft-strain will come upon the bolt C of the outer arm of his clevis, and the draft-strain at the other end of the double-tree will come upon the inner bolt C of that clevis, so that the rear horse will be drawing upon the longer arm of a lever, and the forward horse will be drawing upon the shorter arm of a lever. This gives an advantage of leverage to the rear horse, so that he is able to regain his place and bring the double-tree again into position at right angles with the line of draft, in which position the draft-strain comes equally upon both bolts C of both clevises, each horse then drawing an equal amount of the load.

Having thus described my invention, I claim as new and desire to secure by Letters Patent—

The combination, with the double-tree A, of a U-shaped clevis, B, having V-shaped arms automatically adjustable in arc-slots $a$ $a'$ of the double-tree, as shown and described, for the purpose specified.

AARON ROSIER.

Witnesses:
 WILLIAM SMALL,
 JAMES TEMPLETON.